(12) United States Patent
Suh

(10) Patent No.: US 7,808,900 B2
(45) Date of Patent: Oct. 5, 2010

(54) METHOD, APPARATUS, AND MEDIUM FOR PROVIDING MULTIMEDIA SERVICE CONSIDERING TERMINAL CAPABILITY

(75) Inventor: Doug Young Suh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 312 days.

(21) Appl. No.: 11/102,657

(22) Filed: Apr. 11, 2005

(65) Prior Publication Data

US 2005/0226196 A1    Oct. 13, 2005

Related U.S. Application Data

(60) Provisional application No. 60/561,158, filed on Apr. 12, 2004.

(30) Foreign Application Priority Data

Apr. 26, 2004    (KR)    ........................ 10-2004-0028636

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/230.1; 370/232; 455/414.4; 725/75

(58) Field of Classification Search .............. 455/414.4; 370/230.1, 232.1, 395.64, 232; 725/75, 81; 375/240.01, 240.02, 240.07

See application file for complete search history.

(56) References Cited

U.S. PATENT DOCUMENTS 6,317,131 B2    11/2001    Basso et al.
6,404,814 B1 *   6/2002    Apostolopoulos et al. ...................... 375/240.12
6,907,067 B1     6/2005    Moeller et al.

(Continued)

FOREIGN PATENT DOCUMENTS

EP    0 986 267    3/2000

(Continued)

OTHER PUBLICATIONS

Anonymous, "H.245: Control Protocol for multimedia communication" ITU-T Recommendation, May 1999, pp. 1-2, XP002199601.

(Continued)

*Primary Examiner*—Edward Urban
*Assistant Examiner*—Christian A Hannon
(74) *Attorney, Agent, or Firm*—Staas & Halsey LLP

(57) ABSTRACT

A method of providing multimedia services in consideration of the capability of a terminal, a method of receiving the multimedia services, and a terminal for receiving the multimedia services. The method of providing multimedia services includes receiving information regarding capability of a terminal, and processing data according to the received information and providing the processed data to the terminal. Accordingly, it is possible to provide the server or proxy server with information regarding resources available for a lightweight application terminal, allowing it to provide data at a level of quality best suited to the capabilities of the terminal.

15 Claims, 5 Drawing Sheets

U.S. PATENT DOCUMENTS

| | | | |
|---|---|---|---|
| 7,020,087 B2 * | 3/2006 | Steinberg et al. | 370/238 |
| 7,295,608 B2 * | 11/2007 | Reynolds et al. | 375/240.01 |
| 2001/0055341 A1 * | 12/2001 | Herrmann et al. | 375/240.25 |
| 2002/0059571 A1 * | 5/2002 | Negishi et al. | 725/1 |
| 2002/0097798 A1 | 7/2002 | Manor | |
| 2003/0195988 A1 * | 10/2003 | Sahuc et al. | 709/246 |
| 2005/0005025 A1 * | 1/2005 | Harville et al. | 709/241 |
| 2005/0143090 A1 * | 6/2005 | Dowling | 455/456.1 |

FOREIGN PATENT DOCUMENTS

| | | |
|---|---|---|
| KR | 1020000028940 A | 5/2000 |
| KR | 1020010089232 A | 9/2001 |
| KR | 1020010091921 A | 10/2001 |
| KR | 1020030034410 A | 5/2003 |
| KR | 1020030056103 A | 7/2003 |
| KR | 1020030085518 | 11/2003 |
| WO | 02/37314 | 5/2002 |

OTHER PUBLICATIONS

Nilsson et al., "Composite Capabilities/Preference Profiles: Requirements and Architecture" W3C Working Draft, Online, Jul. 21, 2000, pp. 1-30, XP002335015 (Abstract) (Retrieved from Internet Jul. 6, 2005).

International Organisation for Standardisation: "Call for Proposals for Lightweight Scene Representation" ISO/IEC JTC1/SC29/WG11, Online, Mar. 2004, pp. 1-15, XP002335016 (Retrieved from Internet Jul. 6, 2005).

Benitez et al., "Object-based multimedia content description schemes and applications for MPEG-7" Signal Processing: Image Communication Elsevier Science Publishers, Amsterdam, NL, vol. 16, No. 1-2, Sep. 2000, pp. 235-269, XP004216278.

Soares et al., "MPEG-4: A Flexible Coding Standard for the Emerging Mobile Multimedia Applications", Personal, Indoor and Mobile Radio Communications, 1998, The Ninth IEEE International Symposium, Boston, MA, USA, vol. 3, Sep. 8, 1998, pp. 1335-1339, XP010314681.

European Search Report mailed on Jul. 26, 2005 in European Patent Application No. 05252252.1 which corresponds to U.S. Appl. No. 11/102,657.

Family List of EP 0 986 267.

Composite Capabilities/Preference Profiles: Requirements and Architecture,: W3C Working Draft Jul. 21, 2000: Mikael Nilsson, Johan Hjelm, Hidetaka Ohto.

Chinese Office Action dated Apr. 6, 2007 issued in corresponding Chinese Application No. 2005100633965.

* cited by examiner

METHOD, APPARATUS, AND MEDIUM FOR PROVIDING MULTIMEDIA SERVICE CONSIDERING TERMINAL CAPABILITY

CROSS-REFERENCE TO RELATED APPLICATIONS

This application claims the benefit of U.S. Patent Provisional Application No. 60/561,158, filed on Apr. 12, 2004, in the USPTO, and Korean Patent Application No. 2004-28636, filed on Apr. 26, 2004, in the Korean Intellectual Property Office, the disclosures of which are incorporated herein in their entirety by reference.

BACKGROUND OF THE INVENTION

1. Field of the Invention

The present invention relates to multimedia services, and more particularly, to a method of providing multimedia services considering the capability of a terminal, a method of receiving the multimedia services, and the terminal.

2. Description of the Related Art

As use of mobile communications terminals increases, various application services via a mobile communications network are becoming more and more popular. Thus, the main interests of mobile communications providers are changing from providing voice communications services to providing Internet services and multimedia services using mobile communications terminals. The multimedia services can be provided using a mobile telephone, a Personal Digital Assistant (PDA), or a wireless multimedia terminal installed in a vehicle, via a wireless communications network.

The Motion Picture Experts Group (MPEG) that provides standards for compression of moving pictures is developing standards for Lightweight Application Scene Representation (LASeR) so that various multimedia services can be provided using a terminal having various restrictions. That is, MPEG is now designing standards for LASeR available even under a limited environment by extending MPEG-4, one of the standards developed by MPEG.

Mobile communications services suffer from a shortage of communications channels and terminal resources. For instance, the channel bandwidth changes frequently according to environmental conditions, and data delay or loss is frequent. Also, the power of the terminal and its CPU and memory capacities are limited. As a result, services may be interrupted or even power disconnected. Accordingly, there is a growing need to develop a terminal that can provide multimedia services while working adaptively and detecting available resources within such a limited environment.

SUMMARY OF THE INVENTION

The present invention provides a method of providing multimedia services in consideration of terminal capability, a method of receiving the multimedia services, and a terminal therefor.

According to one aspect of the present invention, there is provided a method of providing multimedia services, the method including obtaining information regarding capability of a terminal, and processing data according to the obtained information and providing the processed data to the terminal. The method may include querying the capability of the terminal, obtaining the information regarding the capability of the terminal using at least one sensor, and quantizing the obtained information.

According to another aspect of the present invention, the information regarding the capability of the terminal may include information including the acceleration and location of a vehicle, which are provided via an intra vehicle network; and information including the strength and available bitrate of a signal providing the information. The information including the location of the vehicle may be obtained by measuring the distance between the terminal and either a base station or an access point. The acceleration of the vehicle may be determined by measuring the linear distance between the terminal and either a base station or an access point.

While processing the data according to the obtained information, the quality of service of the data may be changed according to the obtained information, and the data may be transmitted to the terminal. The quality of the service may be related to the bit rate of the signal transmitted, the size of the video frames, and the number of frames per second. In addition, the processing of data according to the obtained information may further include performing media filtering to prevent the transmission of particular data according to the obtained information, which prevents either video data or audio data from being provided to the terminal.

According to another aspect of the present invention, the information may further include a scene; the processing of data according to the obtained information may further include changing a quality of service of the data; and the information regarding the scene, the quality of service of the data of which is changed, may be described in a language that describes virtual temporal and spatial layout of encoded objects.

The language may have a binary format for the scene in which the construction of the scene using binary data is described in a compressed manner and a substantial linkage relation among media streams may be defined using an object descriptor. The binary format for the scene may use the object descriptor describing reproduction times, locations, and sizes of the respective media objects, and may allow the object descriptor to be modified when a change in quality of multimedia data changes the size of the multimedia data or an object is added or removed from the media objects.

The information regarding the capability of the terminal may be included in a receiver report packet of a real-time control protocol and transmitted to the terminal.

According to another aspect of the present invention, there is provided a method of receiving multimedia services, the method including transmitting information including capability of a terminal, processing data according to the transmitted information, and receiving data processed according to the transmitted information, wherein transmitting information including capability of the terminal may include querying the capability of the terminal, obtaining the information using at least one sensor, and quantizing the information and transmitting the quantized information.

The information may include the capability of the terminal including information including acceleration and location of a vehicle, which may be provided via an intra vehicle network; and including information including the strength and available bitrate of a signal providing the information. The processing of data according to the transmitted information may include changing a quality of service of the data according to the transmitted information.

The information may further include a scene, the processing of data according to the transmitted information may include changing a quality of service of the data, and the information including the scene, the quality of service of the data of which may be changed, may be described in a language that describes virtual temporal and spatial layout of encoded objects. Then, the information may be sent to the terminal, according to the obtained information. The language may have a binary format for the scene in which the construction of the scene using binary data may be described in a compressed manner and a substantial linkage relation among media streams may be represented using an object descriptor.

According to yet another aspect of the present invention, there may be provided a multimedia terminal including at least one sensor which obtains information including the capability of the multimedia terminal, a TermCap handler which converts the obtained information to a predetermined format, and a lightweight application scene description engine which receives the converted information in the predetermined format at predetermined intervals of time or when a server requests the information, and which sends the information to the server via a network access unit.

The sensor may include a first sensor, which receives information regarding a vehicle via an intra vehicle network, and a second sensor that receives information regarding the transmission of data to the multimedia terminal. The first sensor may measure a distance between the multimedia terminal and either a base station or an access point, and may measure an acceleration of the vehicle by measuring the linear distance between the multimedia terminal and either the base station or the access point. The second sensor may measure signal strength and available bit rate of data received by the multimedia terminal.

In another aspect of the present invention, a multimedia terminal may further include an object decoder which decodes data received by the multimedia terminal into units of objects; and a scene composer which receives information regarding the representation of a scene from the lightweight application scene description engine, reconstructs the decoded objects as the scene, and outputs the reconstructed scene to a screen.

In another aspect of the present invention, at least one computer readable recording medium storing instructions that control at least one processor to perform a method of providing multimedia services by a computer, wherein the method includes obtaining information regarding the capability of a terminal; processing data according to the obtained information; and providing the processed data to the terminal.

In another aspect of the present invention, at least one computer readable recording medium storing instructions that control at least one processor to perform a method of receiving multimedia services by a computer, wherein the method includes transmitting information including capability of a terminal; processing data according to the transmitted information; and receiving data processed according to the received information.

A method of providing multimedia services from a network to a terminal, may include obtaining information regarding the capability of the terminal, wherein the information includes resource information, movement and location information of the terminal, and signal strength and available bitrate information, which indicates the signal strength and available bitrate for communication between the network and terminal; processing data including a scene according to the obtained information; and providing the processed data to the terminal.

The resource information may include at least one of frame rate, color depth, screen size, graphics hardware, audio output format, maximum audio sampling rate spatial audio capability, central processing unit load, and memory load. The scene may include at least one of a still image, text, moving image, and audio. The processing of data may include a scene according to the obtained information includes changing a quality of service of the data, and wherein the scene is described in a language that describes virtual temporal and spatial layout of encoded objects.

According to another aspect of the present invention, at least one computer readable recording medium storing instructions that control at least one processor to perform a method of receiving multimedia services by a computer, wherein the method may include obtaining information regarding the capability of the terminal, wherein the information includes resource information, movement and location information of the terminal, and signal strength and available bitrate information, which indicates the signal strength and available bitrate for communication between the network and terminal; processing data including a scene according to the obtained information; and providing the processed data to the terminal.

BRIEF DESCRIPTION OF THE DRAWINGS

These and/or other aspects and advantages of the invention will become apparent and more readily appreciated from the following description of the exemplary embodiments, taken in conjunction with the accompanying drawings of which.

DETAILED DESCRIPTION OF THE PREFERRED EMBODIMENTS

Figure 1:
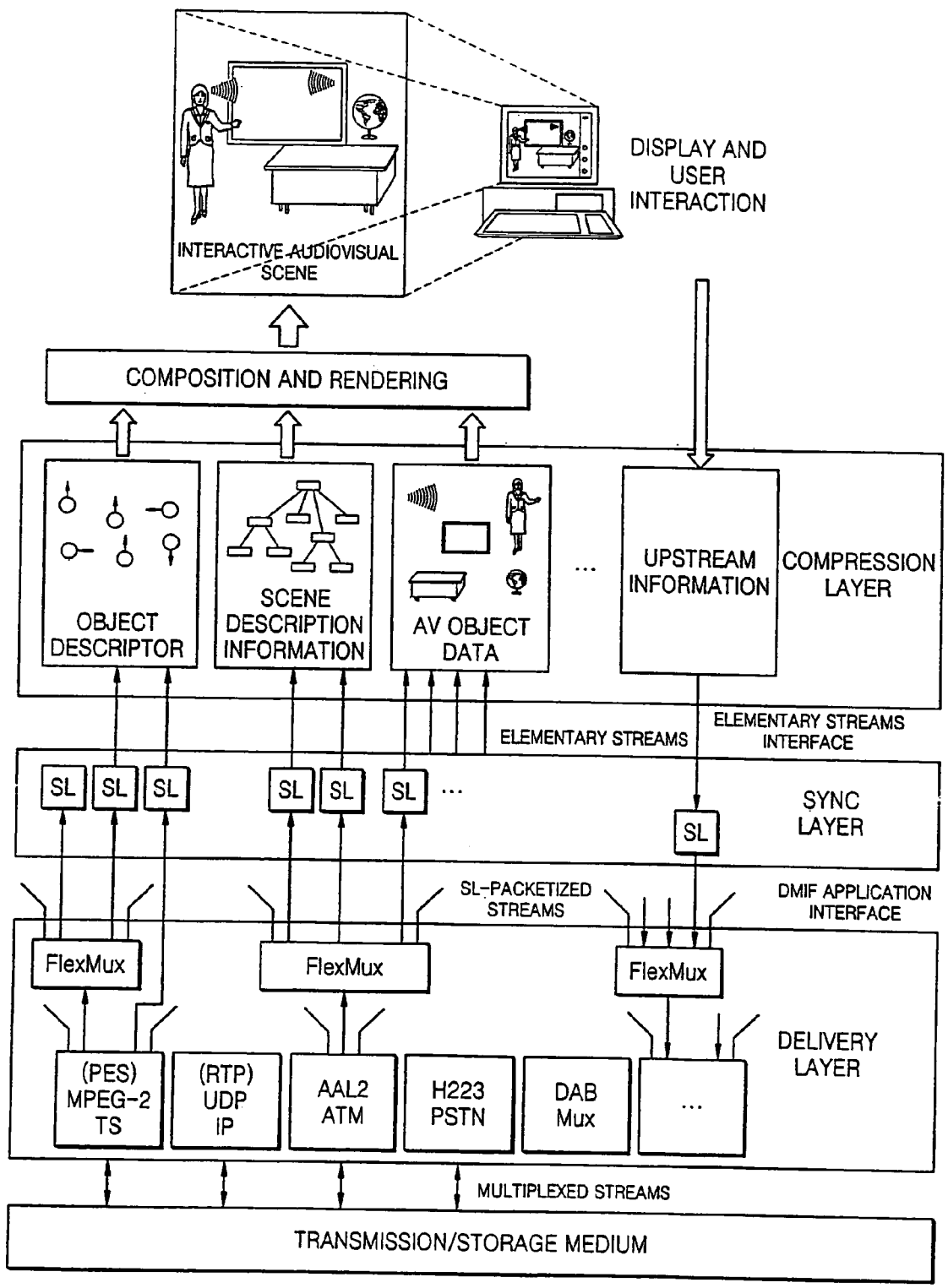
FIG. 1 illustrates an architecture of a Motion Picture Experts Group (MPEG)-4 terminal.

In this disclosure, exemplary embodiments of the present invention will be described in detail with reference to the accompanying drawings. The same reference numerals represent the same elements throughout the drawings.

In Motion Picture Experts Group (MPEG)-4, a natural image is divided into units of Video Objects (VOs), and a plurality of Video Object Planes (VOPs) are formed with a plurality of VOs at a particular point of time. A VOP is a basic unit of video data, defined in MPEG-4. In the case of a formal image, a VOP corresponds to a frame or a field as defined in MPEG-1 and MPEG-2. Also, MPEG-4 defines a face object, a mesh object, and a texture object as objects of a synthetic image. Encoding of a VO with a formal image is called frame-based encoding, and encoding of a VO with a synthetic image is called object-based or context-based encoding. A VO is divided into shapes and text and encoded using motion compensation and estimation encoding. MPEG-4 is a standard for encoding multimedia data containing various objects as described above.

FIG. 1 illustrates an architecture of an MPEG-4 terminal. An MPEG-4 system enables encoded bitstreams of various media objects, such as audio, moving images, computer graphics, and still images, to be multiplexed, synchronized with one another, and combined by scene description.

As shown in FIG. 1, the MPEG-4 system includes scene description information regarding an already-defined multiplexed stream format and the temporal and spatial relationships between media objects, and an object descriptor describing the correlation between media objects for scene description, and information for decoding them.

While MPEG-1 and MPEG-2 provide standards for multiplexing and synchronizing audio and video data, MPEG-4 provides standards for encoding multimedia content, including the arrangement of multimedia objects, such as audio, video, computer graphics, and avatar, in virtual temporal-spatial space, supporting user interaction, and a combination of a copyright protection technique and a metadata technique. Various standards, such as Virtual Reality Modeling Language (VRML), Multimedia and Hypermedia Expert Group (MHEG), HyperText Markup Language (HTML), and Synchronized Multimedia Integration Language (SMIL), can be used to create a multimedia document by unifying multimedia objects. For this, the MPEG-4 system adopts Binary Format for Scene (BIFS) as a standard.

BIFS is an extension of VRML, a language describing a virtual reality in an Internet virtual space. In BIFS, encoded natural or synthetic AudioNideo (AV) objects are arranged in a virtual temporal space and user interaction with the objects are described. BIFS enables compressive representation of a scene using binary information and describes correlation among substantial media streams using an object descriptor (OD).

An image displayed on a screen and viewed by a user is referred to as a scene. MPEG-1 and MPEG-2 are related to encoding of typical video data and do not define the scene. However, MPEG-4 allows any object, including compression-encoded video and an object obtained with given parameters, to be encoded. Since a screen viewed by the user may be obtained from the combination of a number of objects, the MPEG-4 system requires a scene description indicating the representation and characteristics of objects.

That is, the scene may be a screen containing various media objects such as a still image, text, a moving image, and audio. This requires a scene descriptor to describe the spatial and temporal relationships between the media objects in the scene. The scene descriptor is standardized using BIFS.

BIFS also specifies the creation of a scene by combining objects using the scene descriptor and displaying the scene on a screen, and the representation of the capability of a terminal. An MPEG-4 BIFS standard defines sensor nodes, such as SphereSensor, ProximitySensor, TimeSensor, and TouchSensor, to measure the capability of a terminal, and specifies the parameter TermCap to query the terminal capability. A sensor node is a special node that can trigger events based on specific conditions. The parameter TermCap acts as an interface to inform a server of the terminal capability. The parameter TermCap includes nine sub parameters related to screen constitution, CPU and memory use. According to exemplary embodiments of the present invention, sensors are used to measure the terminal capability to make the most of a limited environment such as a mobile communications system. The interface of the parameter TermCap is as follows:

```
TermCap{
    eventIn      SFTime      evaluate
    field        SFInt32     capability
    eventOut     SFInt32     value
    },
``` wherein capability denotes resources, information of which a server requests from the terminal. The resource information specifies nine items: frame rate, color depth, screen size, graphics hardware, audio output format, maximum audio sampling rate, spatial audio capability, CPU load, and memory load. When the server queries the terminal about information related to the terminal capability, the terminal sends the server variable values representing the information.

Figure 2:
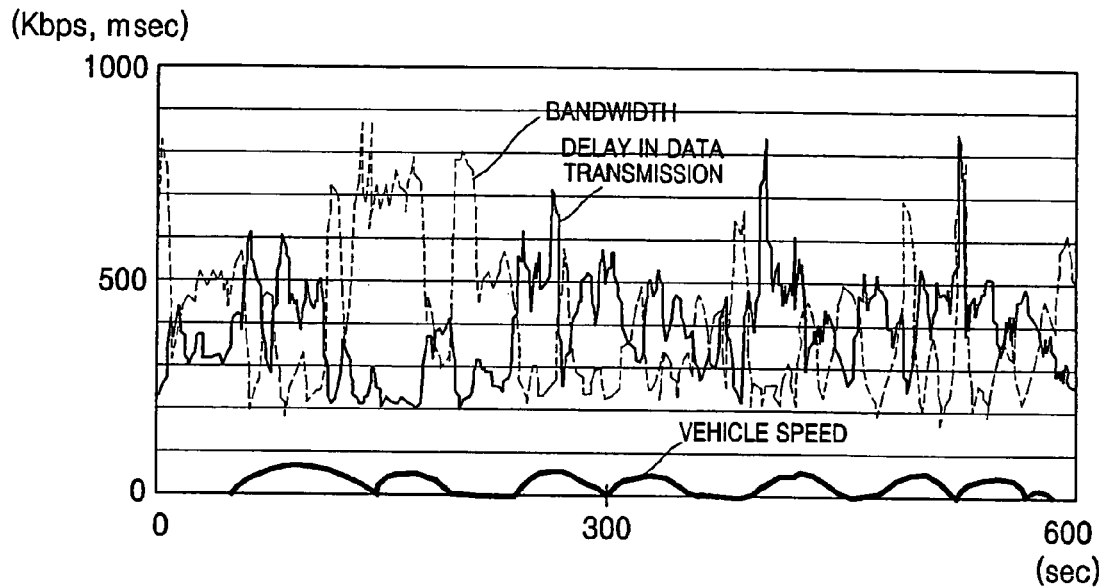
FIG. 2 is a graph illustrating variations in the network bandwidth of a terminal installed in a vehicle and the delay in data transmission with the speed of the vehicle.

FIG. 2 is a graph obtained from an experiment measuring the variations in network bandwidth and delay of a terminal installed in a vehicle, with the speed of the vehicle. In this experiment, a terminal CDMA 1×EV-DO was used to measure the above variations while driving the vehicle for 10 minutes. Originally, the maximum bandwidth of the CDMA 1×EV-DO terminal was 2 Mbps. However, the graph of FIG. 2 reveals that the terminal bandwidth varied substantially, continuously changing between 200 kbps and 800 kbps while the vehicle was moving. In this case, the data delay also varied. The data delay was obtained by measuring a Round Trip Time (RTT) for transmission of data from the terminal to the server and back.

Changes in the bandwidth and data delay are closely related to factors such as the number of users who share a channel, the location of the terminal, and the speed of the vehicle. However, the MPEG-4 BIFS standard does not suggest a scene descriptor for measuring and representing such changes in the terminal capability. Thus, it is impossible to consider changes in measuring the terminal capability. Accordingly, the server is not capable of determining the current state of the terminal. If the terminal receives more data than it can process, the supply of power to the terminal may be interrupted or data reproduction may stop.

Figure 3:
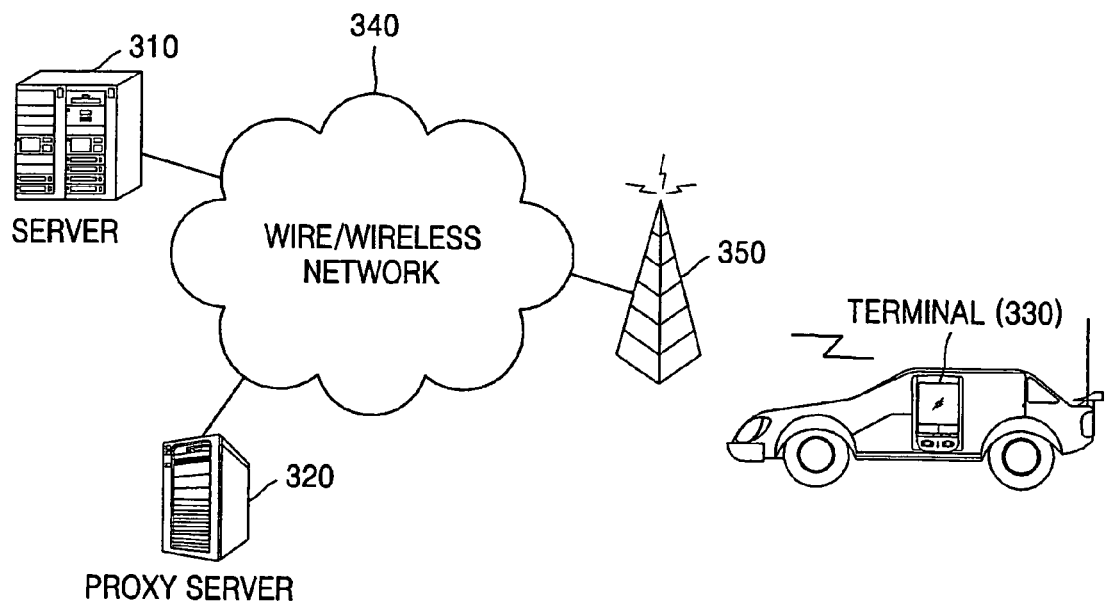
FIG. 3 illustrates a system for providing multimedia services using a lightweight application terminal, according to an exemplary embodiment of the present invention.

FIG. 3 is a diagram of a system for providing multimedia services to a lightweight application terminal 330 according to an exemplary embodiment of the present invention. Referring to FIG. 3, the terminal 330 accesses a server 310 or a proxy server 320 via a wire/wireless network 340 to receive multimedia services. The terminal 330 may be coupled to the wire/wireless network 340 by way of a base station/access point 350. The terminal 330 may be a mobile phone, a Personal Digital Assistant (PDA), or multimedia appliance installed in a vehicle. The terminal 330 reports information regarding its available resources to the server 310 or the proxy server 320 and receives high-quality multimedia services that it can process using its available resources from server 310 or the proxy server 320. The server 310 or the proxy server 320 processes multimedia data according to the information regarding the available resources input of the terminal 330.

In this disclosure, the processing of data may be understood as changing the Quality of Service (QoS) such as a data bit rate, data robustness for data loss, and data quality. If the server 310 or the proxy server 320 processes video data, data quality relates to the frame size and number of frames per second. If the resources of the terminal 330 are very limited, data quality relates to media filtering that does not allow the transmission of particular media objects. For instance, when the performance of the network deteriorates considerably, video data is filtered and only audio data is transmitted, thereby preventing complete interruption of multimedia services.

The server 310 or the proxy server 320 may include an MPEG-21 Digital Item Adaptation (DIA) unit to process data. When there are various types of networks, the MPEG-21 DIA unit defines a process of adapting a digital item, such as video or audio, to meet network conditions, and a format of control information regarding the adaptation of the digital item.

Figure 4:
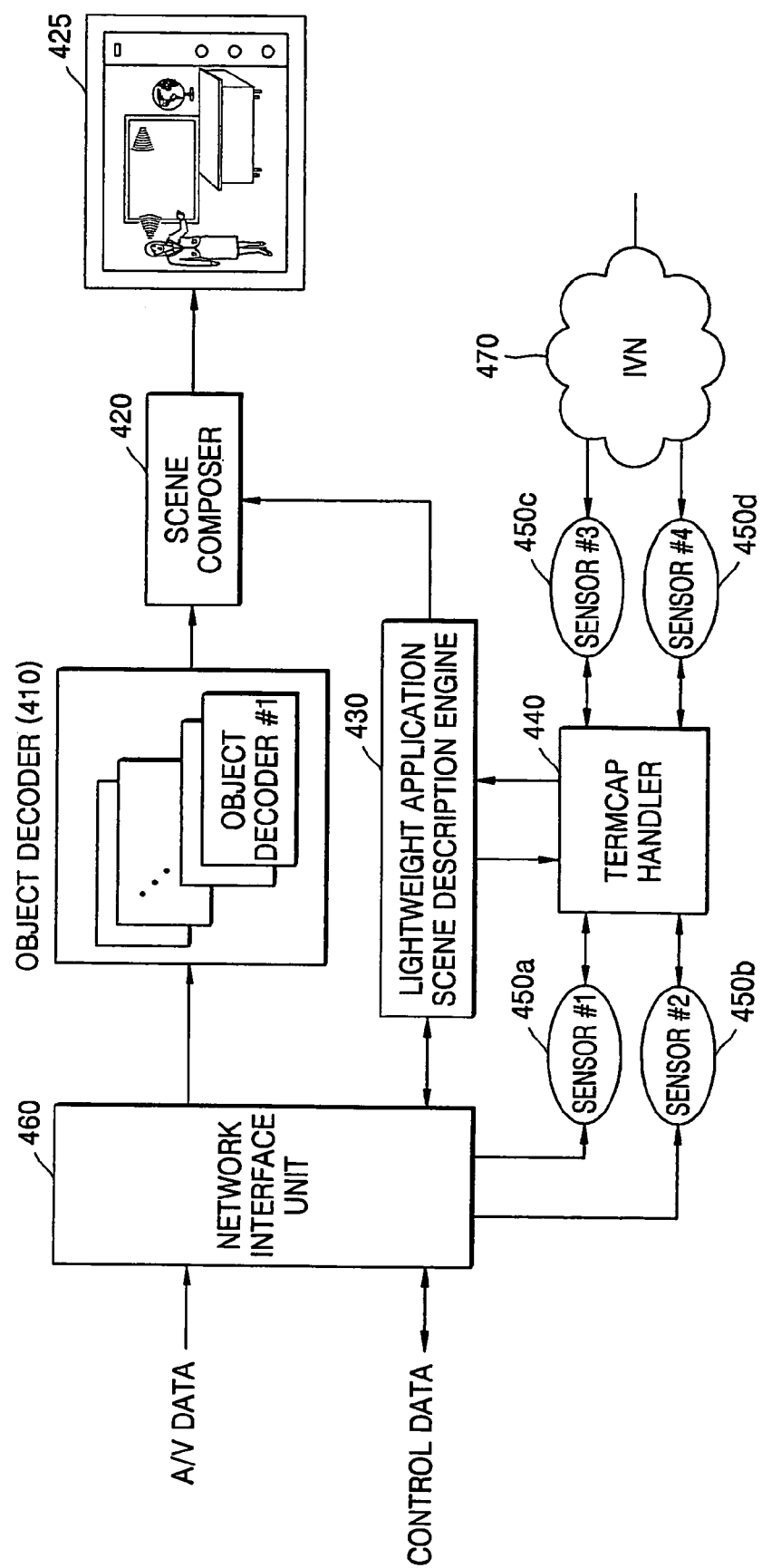
FIG. 4 is a block diagram of a lightweight application terminal, according to an exemplary embodiment of the present invention.

FIG. 4 is a block diagram of a lightweight application terminal according to an exemplary embodiment of the present invention. The terminal of FIG. 4 includes an object decoder 410, a scene composer 420, a lightweight application scene description engine 430, a TermCap handler 440, a plurality of sensors 450a through 450d, and a network interface unit 460.

The object decoder 410 decodes received object data input via the network interface unit 460. The scene composer 420 receives information regarding scene representation from the lightweight application scene description engine 430, reconstructs the decoded object data input from the object decoder 410 to obtain a desired scene, and outputs the obtained scene to a screen 425. The object decoder 410 may include a plurality of decoders capable of decoding objects in parallel.

According to an exemplary embodiment of the present invention, the terminal further includes the four sensors 450a through 450d that measure terminal capability, and uses an extension of the parameter TermCap for an interface for sending information regarding the terminal capability to a server (not shown). The four sensors 450a through 450d may include the sensors 450a and 450b that measure information from the network interface unit 460, and the sensors 450c and 450d that measure information via an Intra Vehicle Network (IVN) 470. The information input via the IVN 470 specifies the movement and location of the vehicle. The information input from the network interface unit 460 specifies the strength and available bandwidth of the Radio Frequency (RF) signal. The strength of the RF signal is measured by the network interface unit 460, and information regarding the available bandwidth is provided from a base station or measured using an application program in the base station or an access point (AP) 350 or included in the terminal.

When the lightweight application scene description engine 430 requests the TermCap handler 440 to send it information regarding the capability of the terminal, the TermCap handler 440 converts the information measured by the sensors 450a through 450d into values that were predetermined together with the lightweight application scene description engine 430, and sends the values to the lightweight application scene description engine 430. The information measured by the sensors 450a through 450d, is converted into possible least significant bits of values, shown in Tables 1 through 2D.

The lightweight application scene description engine 430 queries the TermCap handler 440 about values of the terminal capability periodically, or when the server of a proxy server (not shown) requests these values. Upon receiving the values of the terminal capability, the lightweight application scene description engine 430 converts the values into the small values shown in Tables 1 through 2D and provides them to the server 310 or the proxy server 320.

The server 310 or the proxy server 320 changes a scene and representation of the scene according to the information input from the lightweight application scene description engine 430 via a return channel. When the available bandwidth decreases, only low-levels of hierarchical video data are transmitted. If the signal strength becomes weaker to increase the rate of packet loss, the server 310 or the proxy server 320 devises proper transmission to counteract the data loss.

For packet loss, Forward Error Correction (FEC) may be adopted, or the packet may be sent again. In particular, when data services are provided in real time via the Internet, FEC is mainly used with Reed Solomon (RS) coding. For instance, during the transmission of 10 data packets, four parity packets are further sent together with the 10 data packets. In this case, even if 4 of the 14 packets are lost, it is possible to regain the lost packets. When the rate of data loss is increased, the number of parity packets transmitted is increased to prevent further data loss.

Also, the number of times that data is to be retransmitted may be limited when providing a service such as Video-On-Demand (VOD) that allows a slight delay in data transmission. For instance, data may be retransmitted once or twice, depending on the allowable delay in data transmission and RTT of the network.

The network interface unit 460 may be a Network Interface Card (NIC). The network interface unit 460 reports the state of a wireless channel to the server or the proxy server via the reverse channel. Information regarding the speed or location of the vehicle is sent to the server or the proxy server via the IVN 470.

The network interface unit 460 accesses a wireless Local Area Network (LAN) or a mobile communications network to receive multimedia content. The network interface unit 460 receives information of the current RF signal strength in decibels (dB), and receives information regarding the available bandwidth from the base station or access point 350. The available bandwidth is determined by the number of users who are using a channel and the propagation gain of the channel. Further, information regarding handoff when changing base stations or access points 350 due to movement of the vehicle is received via the network interface unit 460.

The IVN 470 is a type of a network that allows information regarding the speed and location of the vehicle, which is received by sensors 450 installed in the vehicle, to be exchanged among respective elements of the vehicle. The information regarding the location, speed, and acceleration of the vehicle is obtained via the IVN 470. The information regarding the vehicle location allows the terminal to measure the distance between the vehicle and the AP or between the vehicle and the base station or access point 350. The signal strength is inversely proportional to the distance between the vehicle and the AP or base station 350. The quality of a Code Division Multiple Access (CDMA) channel is related to the speed and in particular the acceleration of the vehicle, since changes in speed cause the Doppler effect that prevents synchronization when decoding digital data.

Information regarding factors affecting the transmission rate of multimedia data is provided to the server 310 so as to make the most of given resources. Therefore, the MPEG-4 BIFS standard further provides details of four added factors related to the terminal capability. Factors related to the terminal capability, including the four added factors, are listed in Table 1.

TABLE 1

| Capability | Semantics of Value |
|---|---|
| 0 | frame rate |
| 1 | color depth |
| 2 | screen size |
| 3 | graphics hardware |
| 21 | signal strength |

TABLE 1-continued

| Capability | Semantics of Value |
|---|---|
| 22 | available bitrate |
| 23 | acceleration of vehicle |
| 24 | location |
| 32 | audio output format |
| 33 | maximum audio sampling rate |
| 34 | spatial audio capability |
| 64 | CPU load |
| 65 | memory load |

Table 1 reveals that the TermCap handler 440 further receives information regarding factors such as signal strength, available bitrate, and acceleration and location of the vehicle. The location of the vehicle is determined by measuring the distance between the vehicle and the base station or AP 350. The acceleration of the vehicle is measured according to a variation in the linear distance between the vehicle and the base station or the AP 350. If the vehicle circles the base station or AP, the distance between the vehicle and the base station or AP 350 does not change, and thus, the vehicle acceleration is zero. If it is impossible to measure the distance between the vehicle and the base station or AP 350, the acceleration of the vehicle is used. The further received information regarding factors are expressed with values that were predetermined together with the system, as shown in Tables 2A through 2D.

TABLE 2A

| Predetermined Value | Signal Strength |
|---|---|
| 0 | unknown |
| 1 | 10 dB or less |
| 2 | 10-20 dB |
| 3 | 20-30 dB |
| 4 | 30-50 dB |
| 5 | 50 dB or more |

TABLE 2B

| Predetermined Value | Available Bitrate |
|---|---|
| 0 | unknown |
| 1 | 20 kbps or less |
| 2 | 20-100 kbps |
| 3 | 100-500 kbps |
| 4 | 500 kbps-1 Mbps |
| 5 | 1-2 Mbps |
| 6 | 2-6 Mbps |
| 7 | 6 Mbps or more |

TABLE 2C

| Predetermined Value | Acceleration |
|---|---|
| 0 | unknown |
| 1 | 0.1 m/sec$^2$ or less |
| 2 | 0.1-0.5 m/sec$^2$ |
| 3 | 0.5-1 m/sec$^2$ |
| 4 | 1-5 m/sec$^2$ |
| 5 | 5 m/sec$^2$ or more |

TABLE 2D

| Predetermined Value | Distance between vehicle and base station or AP |
|---|---|
| 0 | unknown |
| 1 | 1 m or less |
| 2 | 1-10 m |
| 3 | 10-100 m |
| 4 | 100-1000 m |
| 5 | 1000 m or more |

The four added factors listed in Table 1 may be defined using the syntax of the parameter TermCap.

Since the terminal capability changes over time, the quality of multimedia data and a scene descriptor for representation of a scene must be changed adaptively with the terminal capability. When using the MPEG-4 BIFS standard, the scene descriptor describes the reproduction times, locations, and sizes of displayed objects, such as video, audio, and background images. However, when a change in the quality of multimedia data changes the size of an object is added or removed, the scene descriptor must be modified accordingly. For the modification, commands such as modify, insert, delete, and pause, which are used in BIFS, are available.

A multimedia codec supporting scalability may be applicable to exemplary embodiments of the present invention. Also, exemplary embodiments of the present invention can be effectively performed using signaling of a Real Time Protocol (RTP) or Audio Visual Profile with early Feedback (AVPF) in the backward direction, which is standardized by the Internet Engineering Task Force (IETF), which is an Internet Standard Organization. In AVPF, a feedback signal is defined according to its value. That is, feedback signal values of 0, 1, 2, or 3, respectively indicate unassigned, picture loss indication, slice lost indication, and Reference Picture Selection Indication (RPSI) of the feedback signal.

These feedback signals may be included into a Receiver Report (RR) packet of a Real Time Control Protocol (RTCP). Also, data processed by the TermCap handler 440 may be included in a field of the RR packet of the RTCP, defined by a user. In this case, the server 310 or the proxy server 320 may properly change the quality of multimedia data. For instance, if the multimedia data is scalable-encoded video, the server 310 or the proxy server 320 may select a layer of the video that is to be transmitted, in consideration of the available bitrate. Also, the rate of packet loss may be estimated based on the signal strength, and the ratio of parity packets to data packets may be determined based on the estimated rate of packet loss. The ratio of parity packets to loss packets is preferably 2:1. In other words, when the rate of packet loss is 10%, 16 data packets are preferably transmitted together with four parity packets.

Figure 5:
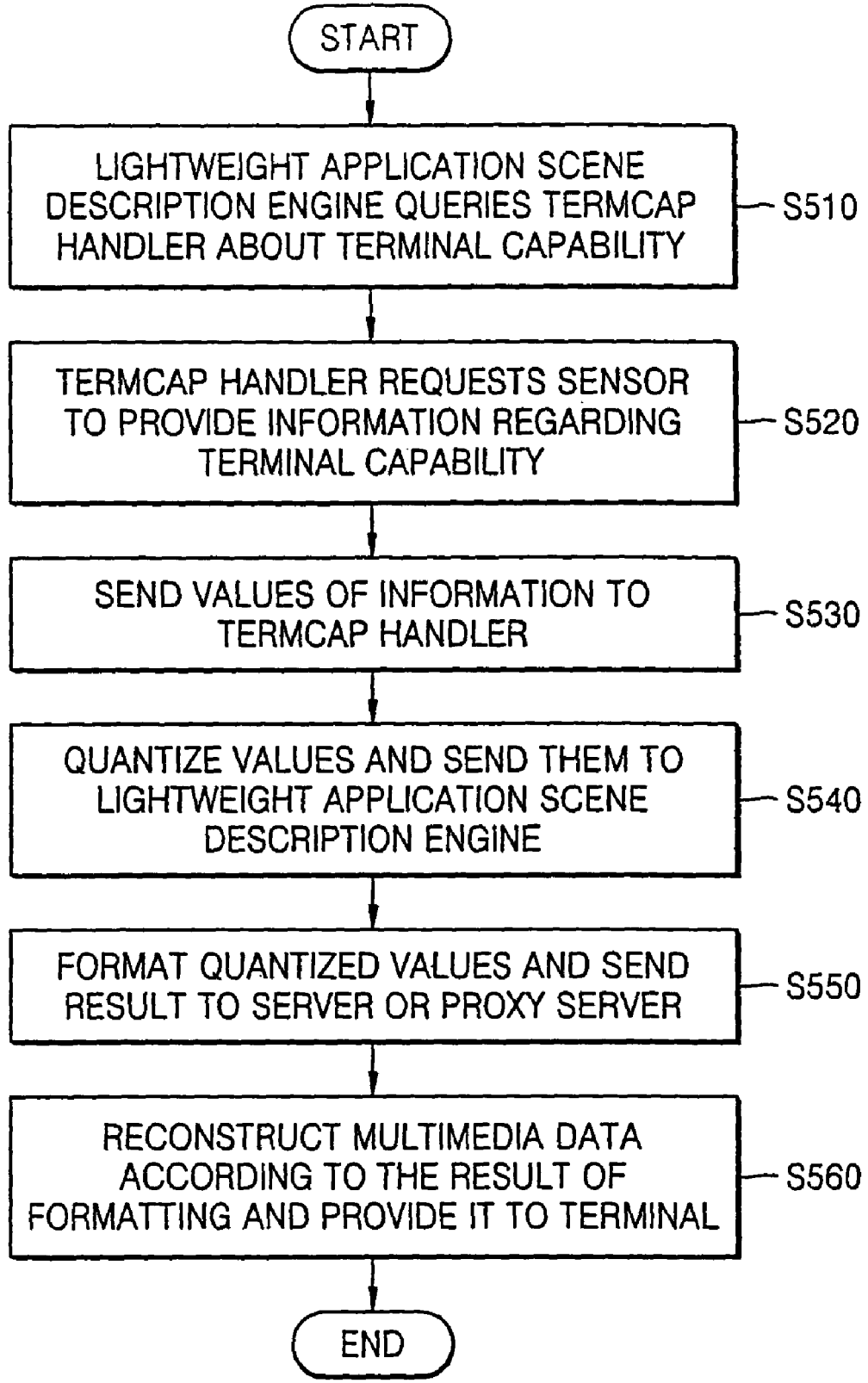
FIG. 5 is a flowchart of a method of providing multimedia services, according to an exemplary embodiment of the present invention.

FIG. 5 is a flowchart of a method of providing multimedia services according to an exemplary embodiment of the present invention. Referring to FIG. 5, when the lightweight application scene description engine 430 of FIG. 4 queries the TermCap handler 440 about the capability of a terminal (S510), the TermCap handler 440 requests one of the sensors 450*a* through 450*d* to provide information regarding the terminal capability (S520). Then, the one of the sensors 450*a* through 450*d* measures values related to the terminal capability using information input via the network interface unit 460 or the IVN 470, and sends the measured values to the TermCap handler 440 (S530). Next, the TermCap handler 440 quantizes the values and sends them to the lightweight application scene description engine 430 (S540). Then, the lightweight application scene description engine 430 formats the quantized values of the items of the terminal capability and sends the result to the server 310 or the proxy server 320 (S550). Thereafter, the server 310 or the proxy server 320 reconstructs multimedia data by changing a scene and a scene descriptor based on the formatted terminal capability and provides the reconstructed multimedia data to the terminal (S560).

Figure 6:
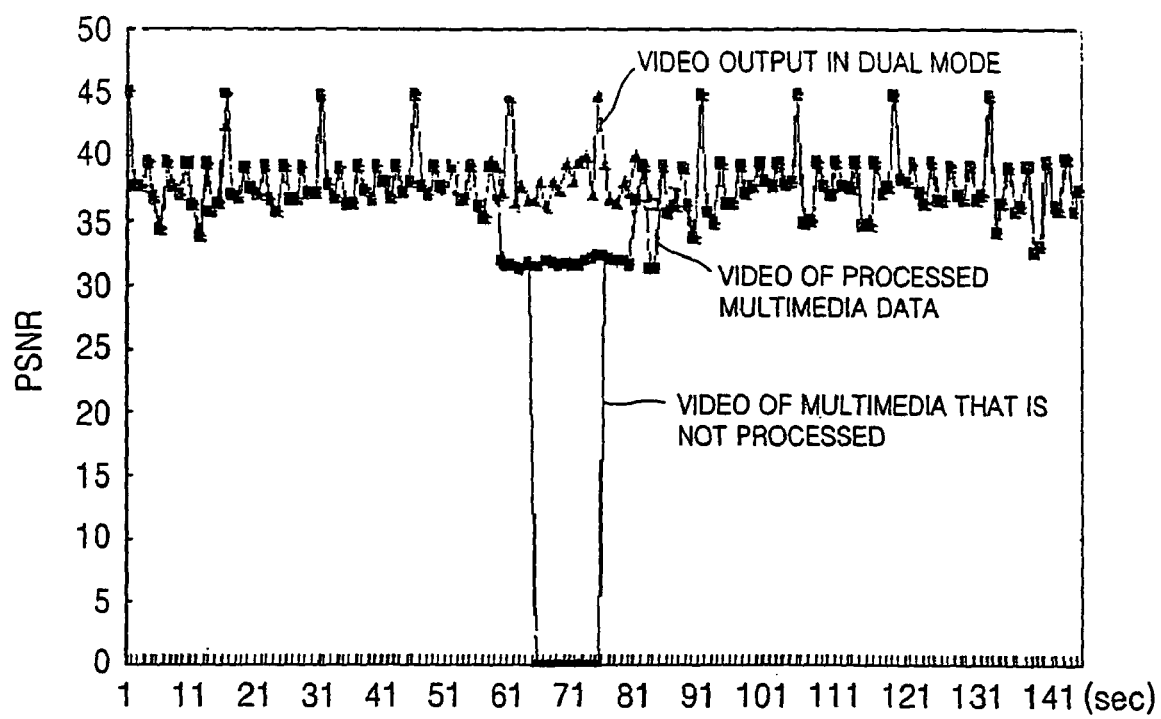
FIG. 6 is a graph illustrating the variation in quality of video data of multimedia services provided according to an exemplary embodiment of the present invention during handoff, occurring where the video data is passed from one AP to another AP via a wireless Local Area Network (LAN).

FIG. 6 is a graph obtained from an experiment measuring the variation in quality of video data of multimedia services provided according to an exemplary embodiment of the present invention during handoff where the video data is passed from an AP to another AP via a wireless Local Area Network (LAN). In this experiment, scalable-encoded video data was used. This experiment revealed that the quality of video was excellent in a dual channel mode, where two network interfaces exchanged data with two APs, and although the quality of video data deteriorated slightly during handoff, a pause was avoided by processing multimedia data according to information regarding the capability of a terminal, according to an exemplary embodiment of the present invention. However, when multimedia data was provided to the terminal without considering the channel state, a pause in data reproduction occurred.

A method of providing multimedia services according to exemplary embodiments of the present invention can be embodied as a computer readable program, computer readable instructions, and/or computer readable code for execution in a general purpose computing device. Codes and code segments of the program can be easily derived by computer programmers in the art to which the present invention belongs. The computer program may be stored in a computer readable medium and be read to execute the method by a computer. Here, the computer readable medium may be any recording apparatus capable of storing data that can be read by a computer system.

Examples of the computer-readable data storage medium include a magnetic recording medium (e.g., a ROM, a floppy disc, or a hard disc), an optical recording medium (e.g., a CD-ROM or a DVD), and a carrier wave medium or digital transmission medium (e.g., data transmission through the Internet). Examples of the computer-readable data storage medium further include any type of transmission medium including networks, which may be wired networks, wireless networks or any combination thereof. The computer-readable data storage medium may be referred to as a medium, and the medium may be distributed among computing devices as part of one or more networks or coupled with one or more networks.

As described above, according to exemplary embodiments of the present invention, the server 310 or proxy server 320 is given information regarding resources available for a lightweight application terminal, allowing it to provide data at a level of quality best suited to the capabilities of the terminal.

According to exemplary embodiments of the present invention, handoff can be predicted based on the signal strength, and in this case, only basic layers of video data are transmitted, lowering the data transmission rate to continue providing video service. The fourth-generation wireless communications network requires cells to be reduced to pico cells with a diameter of 100 m, requiring more frequent handoffs and greater risk of service interruption. Therefore, preventative measures such as shown and described in exemplary embodiments of the present invention are imperative.

Although a few exemplary embodiments of the present invention have been shown and described, it will be appreciated by those skilled in the art that changes may be made in these exemplary embodiments without departing from the principles and spirit of the invention, the scope of which is defined in the claims and their equivalents.

What is claimed is:

1. A method of providing multimedia services, comprising:
   obtaining information regarding capability of a terminal from the terminal to provide the multimedia services;
   processing data according to the obtained information; and
   providing the processed data to the terminal,
   wherein the information regarding the capability of the terminal comprises:
   information including location of the terminal; and
   information including strength and available bitrate of a signal providing the information,
   wherein said processing data according to the obtained information further includes changing a quality of service of the data according to the obtained information by changing a scene and a scene descriptor, which describe the spatial and temporal relationship between media objects in the scene, according to the obtained information, and
   wherein the information further comprises acceleration of a vehicle determined by measuring the linear distance between the terminal and either a base station or an access point.

2. The method of claim 1, wherein said obtaining information regarding capability of the terminal comprise:
   querying the capability of the terminal;
   obtaining the information regarding the capability of the terminal using at least one sensor; and
   quantizing the obtained information.

3. The method of claim 1, wherein the information including the location of the terminal is obtained by measuring the distance between the terminal and either a base station or an access point.

4. The method of claim 1, wherein the quality of service is related to the bit rate of the signal transmitted, the size of video frames, and the number of frames per second.

5. The method of claim 1, wherein the scene description is described in a language that has a binary format for the scene in which the construction of the scene using binary data is described in a compressed manner and a substantial linkage relation among media streams is defined using an object descriptor.

6. The method of claim 1, wherein the information regarding the capability of the terminal is included in a receiver report packet of a real-time protocol and transmitted to the terminal.

7. A method of providing multimedia services, comprising:
   obtaining information regarding capability of a terminal from the terminal to provide the multimedia services;
   processing data according to the obtained information; and
   providing the processed data to the terminal,
   wherein the information regarding the capability of the terminal comprises:
   information including location of the terminal; and
   information including strength and available bitrate of a signal providing the information,
   wherein said processing data according to the obtained information further includes changing a quality of service of the data according to the obtained information by changing a scene and a scene descriptor, which describe the spatial and temporal relationship between media objects in the scene, according to the obtained information,
   wherein the scene description is described in a language that has a binary format for the scene in which the construction of the scene using binary data is described in a compressed manner and a substantial linkage relation among media streams is defined using an object descriptor, and wherein the binary format for the scene uses the object descriptor describing reproduction times, locations, and sizes of the respective media objects, and allows the object descriptor to be modified when a change in quality of multimedia data changes the size of the multimedia data or an object is added or removed from the media objects.

8. A multimedia terminal comprising:

at least one sensor which obtains information including a capability of the multimedia terminal to provide the multimedia services;

a TermCap handler which converts the obtained information to a predetermined format; and a lightweight application scene description engine which receives the converted information in the predetermined format at predetermined intervals of time or when a server requests the information, and which sends the information to the server from the multimedia terminal via a network access unit, wherein the sensor comprises:

a first sensor which receives information regarding location of the terminal; and a second sensor which receives information regarding transmission of data to the multimedia terminal, and wherein the server changes a quality of service of the data according to the information by changing a scene and a scene descriptor, which describe the spatial and temporal relationship between media objects in the scene, according to the obtained information.

9. The multimedia terminal of claim 8, wherein the first sensor measures a distance between the multimedia terminal and either a base station or an access point, and measures an acceleration of the vehicle by measuring the linear distance between the multimedia terminal and either the base station or the access point.

10. The multimedia terminal of claim 8, wherein the second sensor measures signal strength and available bit rate of data received by the multimedia terminal.

11. The multimedia terminal of claim 8, further comprising:

an object decoder which decodes data received by the multimedia terminal into units of objects; and a scene composer which receives information regarding the representation of a scene from the lightweight application scene description engine, reconstructs the decoded objects as the scene, and outputs the reconstructed scene to a screen.

12. At least one computer readable recording medium storing instructions that control at least one processor to perform a method of providing multimedia services by a computer, wherein the method comprises:

obtaining information regarding capability of a terminal from the terminal to provide the multimedia services;

processing data according to the obtained information; and providing the processed data to the terminal, wherein the information regarding the capability of the terminal comprises:

information including location of the terminal; and information including strength and available bitrate of a signal providing the information, wherein said processing data according to the obtained information further includes changing a quality of service of the data according to the obtained information by changing a scene and a scene descriptor, which describe the spatial and temporal relationship between media objects in the scene, according to the obtained information, and wherein the information further comprises acceleration of a vehicle determined by measuring the linear distance between the terminal and either a base station or an access point.

13. A method of providing multimedia services from a network to a terminal, comprising:

obtaining information regarding the capability of the terminal from the terminal to provide the multimedia services, wherein the information includes resource information, movement and location information of the terminal, and signal strength and available bitrate information, which indicates the signal strength and available bitrate for communication between the network and terminal;

processing data including a scene according to the obtained information; and providing the processed data to the terminal, wherein said processing data according to the obtained information further includes changing a quality of service of the data according to the obtained information by changing a scene and a scene descriptor, which describe the spatial and temporal relationship between media objects in the scene, according to the obtained information, and wherein the resource information comprises frame rate, color depth, screen size, graphics hardware, audio output format, maximum audio sampling rate spatial audio capability, central processing unit load, and memory load.

14. The method of claim 13, wherein the scene includes at least one of a still image, text, moving image, and audio.

15. At least one computer readable recording medium storing instructions that control at least one processor to perform a method of receiving multimedia services by a computer, wherein the method comprises:

obtaining information regarding the capability of the terminal from the terminal to provide the multimedia services, wherein the information includes resource information, movement and location information of the terminal, and signal strength and available bitrate information, which indicates the signal strength and available bitrate for communication between the network and terminal;

processing data including a scene according to the obtained information; and providing the processed data to the terminal, wherein said processing data according to the obtained information further includes changing a quality of service of the data according to the obtained information by changing a scene and a scene descriptor, which describe the spatial and temporal relationship between media objects in the scene, according to the obtained information, and wherein the resource information comprises frame rate, color depth, screen size, graphics hardware, audio output format, maximum audio sampling rate spatial audio capability, central processing unit load, and memory load.

* * * * *

UNITED STATES PATENT AND TRADEMARK OFFICE
CERTIFICATE OF CORRECTION

| | |
|---|---|
| PATENT NO. | : 7,808,900 B2 |
| APPLICATION NO. | : 11/102657 |
| DATED | : October 5, 2010 |
| INVENTOR(S) | : Doug-Young Suh |

It is certified that error appears in the above-identified patent and that said Letters Patent is hereby corrected as shown below:

Column 12, Line 27, In Claim 2, delete "comprise:" and insert --comprises:--, therefor.

Signed and Sealed this
Tenth Day of July, 2012

David J. Kappos
*Director of the United States Patent and Trademark Office*